J. M. MEEKINS.
TWIN SIGNAL ELECTRIC LAMP.
APPLICATION FILED AUG. 31, 1915.
1,202,870.
Patented Oct. 31, 1916.
2 SHEETS—SHEET 2.
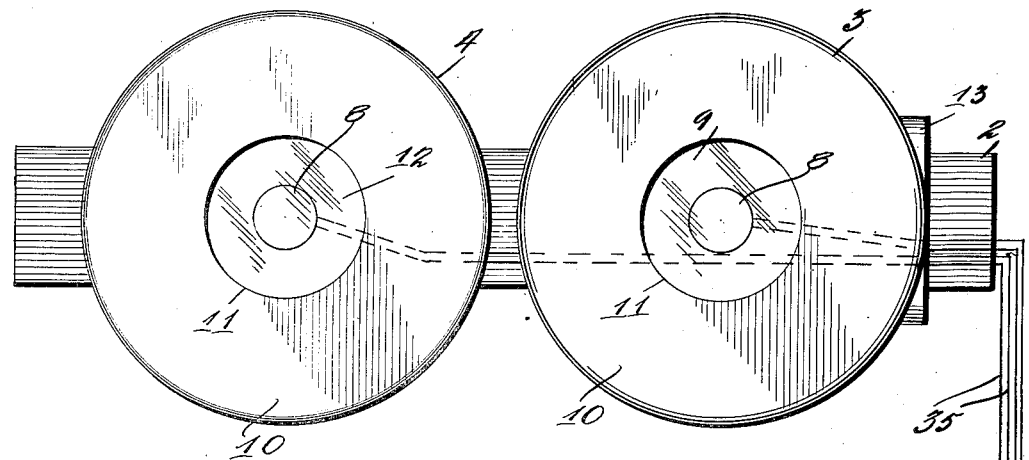
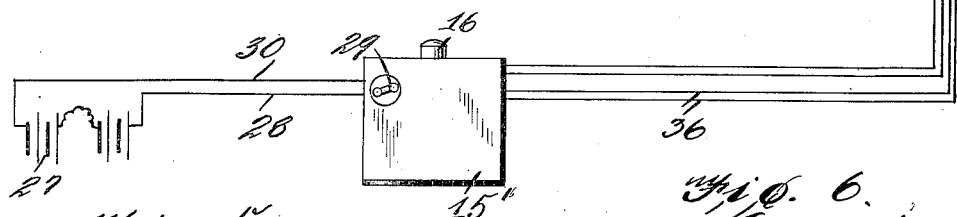
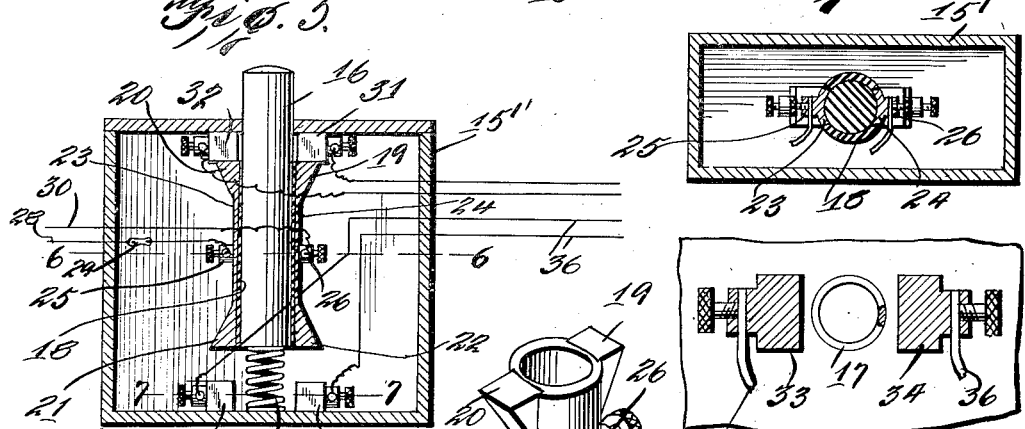
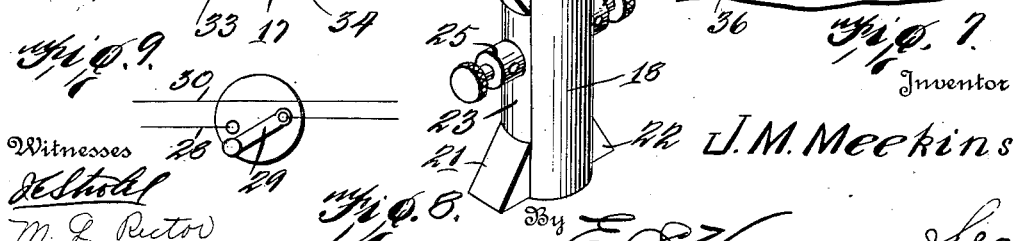

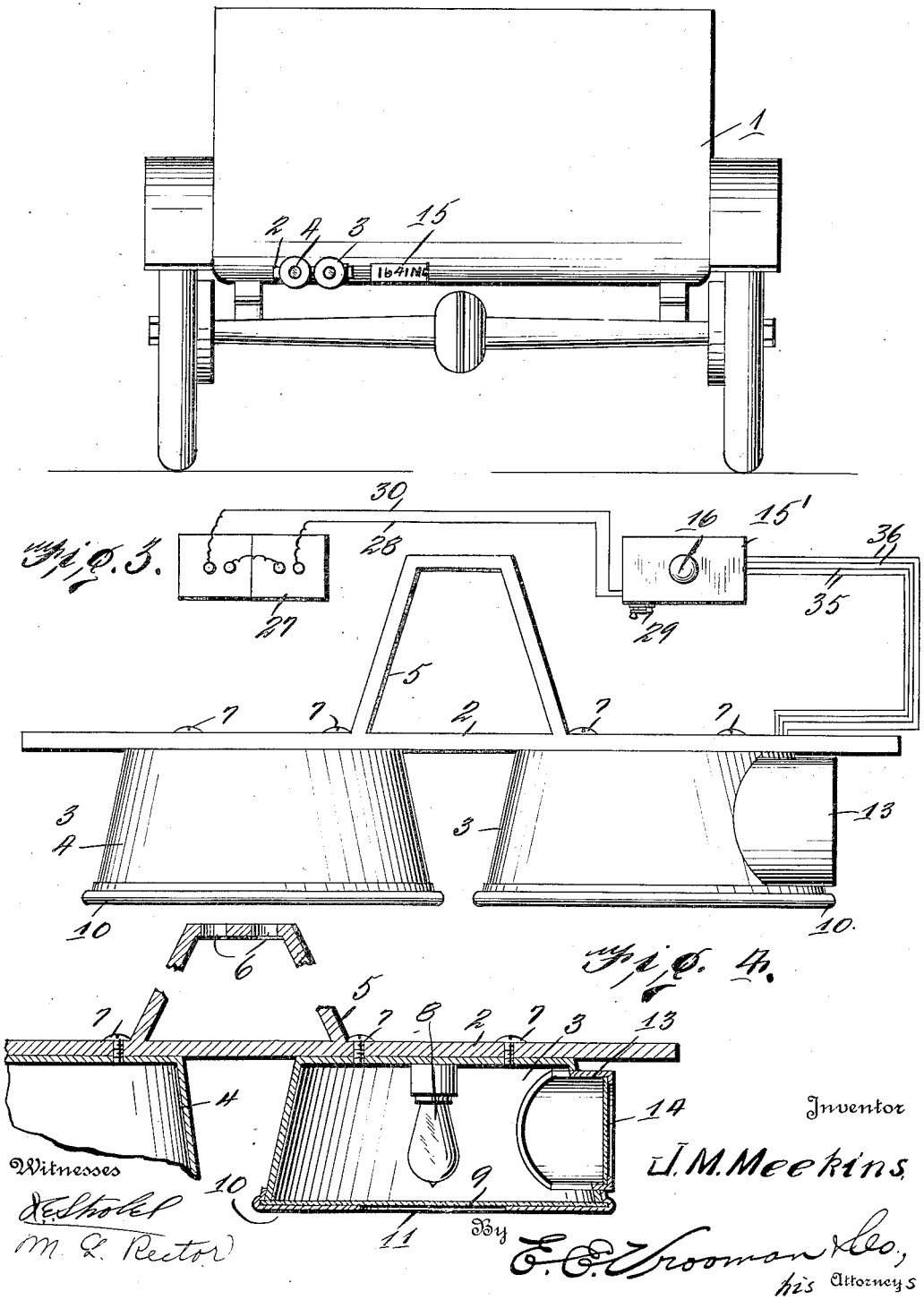

UNITED STATES PATENT OFFICE.

JEREMIAH M. MEEKINS, OF BALTIMORE, MARYLAND, ASSIGNOR OF ONE-HALF TO WILLIAM H. GAHAN, OF BALTIMORE, MARYLAND.

TWIN SIGNAL ELECTRIC LAMP.

1,202,870.  Specification of Letters Patent.  Patented Oct. 31, 1916.

Application filed August 31, 1915. Serial No. 48,286.

*To all whom it may concern:*

Be it known that I, JEREMIAH M. MEEKINS, a citizen of the United States of America, residing at No. 725 North Central avenue, Baltimore, in the State of Maryland, have invented certain new and useful Improvements in Twin Signal Electric Lamps, of which the following is a specification, reference being had therein to the accompanying drawing.

This invention relates to signals for automobiles which are especially adapted to be carried in the rear of the automobile for the purpose of indicating to a machine following the fact that the automobile carrying the signal will change the direction of travel or is coming to a stop.

Another object of this invention is the production of a simple and efficient means for illuminating the license number and supporting the indicating lamps in an efficient manner upon the rear of the automobile.

A still further object of this invention is the production of a simple and efficient means for closing the several circuits which control the respective signal lights.

With these and other objects in view, this invention consists of certain novel combinations, constructions, and arrangements of parts as will be hereafter fully described and claimed.

In the accompanying drawings, Figure 1 is a rear elevation of the automobile, showing the signals applied thereto. Fig. 2 is a rear elevation of the signal lamps and housings. Fig. 3 is a top plan view of the lamp housings, showing the electrical wiring for lighting the lamps mounted therein. Fig. 4 is a longitudinal section through a portion of the lamp housings. Fig. 5 is a vertical section through the contact box. Fig. 6 is a section taken on line 6—6 of Fig. 5. Fig. 7 is a section taken on line 7—7 of Fig. 5. Fig. 8 is a detailed perspective of the contact sleeve supported by the push button. Fig. 9 is a top plan view of the switch for controlling the general supply of current, through the several electric circuits.

Referring to the accompanying drawings by numerals it will be seen that 1 designates the automobile or other vehicle to which the signal may be attached. A lamp supporting bracket 2 is adapted to support the lamp housings 3 and 4 and this bracket 2 is provided with a rearwardly extending substantially V-shaped projecting portion 5 having an aperture 6 formed therein for the purpose of permitting the bracket 2 to be conveniently attached to the body or frame of an automobile in any desired or convenient position.

Each of the lamp housings 3 and 4 is secured to the bracket 2 by means of the screws 7. A lamp 8 is mounted within each of the lamp housings 3 and 4 and the lamp housing 3 carries a red color plate 9 upon the front face thereof which is retained in its correct position by means of a metallic cap 10 having a centrally located illuminating aperture 11 formed therein. A green color plate 12 is carried by the lamp housing 4 and is supported in its proper position in the same manner as that described with respect to the lamp housing 3.

The lamp housing 3 is provided with a laterally extending neck 13 which carries a red color plate 14 and is adapted to illuminate the license number tag 15 which is supported upon the automobile or vehicle 1 to the side of the lamp housing 4.

As illustrated clearly in Figs. 2 and 3, these lamp housings 3 and 4 are supported side by side, the lamp 8 within the lamp housing 3 being normally lighted.

A contact box 15' is supported in any convenient position upon the vehicle, preferably within reach of the operator of the machine or vehicle and within this box 15' is slidably mounted a push-button 16 which is supported by means of a coiled spring 17. A sleeve 18 is carried by the push-button 16 and this sleeve 18 is provided upon the upper end with laterally extending contact ears 19 and 20 and is provided upon the lower end with contact ears 21 and 22.

The sleeve 18 is preferably formed of insulating material whereas the ears 19, 20, 21 and 22 are preferably formed of conducting material, the ears 20 and 21 being electrically connected by means of a contact strip 23 and the ears 19 and 22 being connected with a contact strip 24. A binding post 25 is carried by the contact strip 23 and a binding post 26 is carried by the contact strip 24. The binding post 25 is electrically connected to a source of electrical supply such as the battery 27 by means of a wire 28, the wire 28 carrying a switch 29 for controlling the throwing of the battery 27 into and out of contact for actuating the signal lights when so desired. The binding post 26 is also electrically connected to the battery 27 by means of a wire 30.

Contact posts 31 and 32 are supported upon the top of the contact box 15' and binding posts 33 and 34 are carried by the bottom of the contact box 15'. The upper contact posts 31 and 32 are electrically connected with the light 8 within the lamp housing 3 by means of the wires 35, whereas the contact posts 33 and 34 are connected to the light 8 within the lamp housing 4 by means of the wires 36.

From the foregoing description it will be seen that the contact ears 19 and 20 will normally engage the contact posts 31 and 32 and when the cut-out switch 29 is closed, the light 8 within the lamp housing 3 will normally be illuminated, due to the fact that the current will flow from the battery through the wire 30, up through the contact ear 19, through the contact post 31, through one of the wires 35, to the light 8 in the lamp housing 3 and back through one of the wires 35, to the contact post 32, then through ear 20, and return to the battery 27, through the wire 28. Should the vehicle be brought to a stop or change the direction of travel, the operator or driver of the vehicle or automobile will push the push-button 16 downwardly, thereby breaking the circuit between the ears 19 and 20 and contact posts 31 and 32 and closing the circuit between the lower ears 21 and 22 and the contact posts 33 and 34. As soon as the pressure is released from the push-button 16, the spring 17 will return the push button to its normal position, as shown in Fig. 5 of the drawings.

When the push-button 16 is depressed for closing the circuit as just described, the current will pass through the ears 22 from the wire 30, through the contact post 34, through one of the wires 36 to the light 8 in the lamp housing 4, back through one of the wires 36 to the contact post 33, up through the ear 21, and return to the battery 27 through the wire 28, thereby lighting the green light carried by the lamp housing 4.

What I claim is:—

1. As a new article of manufacture, a circuit closing device especially adapted for controlling signals upon a circuit mounted upon a vehicle and the like comprising a contact box, a push button placed within said box, said push button comprising an insulated body being substantially tubular in shape, said insulated body provided with a longitudinally extending channel upon each side thereof, an electrical conducting bar fitted within each channel portion, each bar provided with laterally projecting contact fingers, means formed upon each bar for facilitating the connection of an electrical conducting wire thereto, and contact means carried by said contact box for engaging said contact fingers whereby an electrical circuit will be closed therethrough.

2. A circuit closing device of the class described comprising a contact box, contact means formed in said box, a circuit closing plunger positioned within said box and comprising a push button, an insulated sleeve fitted around said push button, means for normally urging said push button upwardly, said insulated sleeve provided with a longitudinally extending channel upon each side thereof, a conducting strip positioned within each channel, each conducting strip provided with laterally extending contact fingers adapted to engage the contact means formed in said box, and means for facilitating the connection of the contact wire to said contact strips.

In testimony whereof I hereunto affix my signature.

JEREMIAH M. MEEKINS.